(12) United States Patent
Hoshiba

(10) Patent No.: US 7,972,535 B2
(45) Date of Patent: Jul. 5, 2011

(54) COMPOSITE PARTICLES FOR ELECTROCHEMICAL DEVICE ELECTRODE, METHOD OF PRODUCTION OF COMPOSITE PARTICLES FOR ELECTROCHEMICAL DEVICE ELECTRODE, AND ELECTROCHEMICAL DEVICE ELECTRODE

(75) Inventor: Koji Hoshiba, Tokyo (JP)

(73) Assignee: Zeon Corporation, Tokyo (JP)

( * ) Notice: Subject to any disclaimer, the term of this patent is extended or adjusted under 35 U.S.C. 154(b) by 310 days.

(21) Appl. No.: 12/225,795

(22) PCT Filed: Mar. 27, 2007

(86) PCT No.: PCT/JP2007/056323
§ 371 (c)(1),
(2), (4) Date: Sep. 30, 2008

(87) PCT Pub. No.: WO2007/116718
PCT Pub. Date: Oct. 18, 2007

(65) Prior Publication Data
US 2009/0267028 A1      Oct. 29, 2009

(30) Foreign Application Priority Data

Mar. 30, 2006  (JP) ................................. 2006-095916
Nov. 30, 2006  (JP) ................................. 2006-322886

(51) Int. Cl.
*H01B 1/00*   (2006.01)
*H01M 4/13*   (2010.01)
*H01M 4/34*   (2006.01)

(52) U.S. Cl. .......................... 252/500; 429/217; 429/232
(58) Field of Classification Search .................. 252/500; 429/217.232
See application file for complete search history.

(56) References Cited

U.S. PATENT DOCUMENTS

| 2005/0064096 A1 | 3/2005 | Kurihara et al. |
| 2005/0158546 A1* | 7/2005 | Shizuka ........................ 428/402 |
| 2008/0030924 A1 | 2/2008 | Mori et al. |

FOREIGN PATENT DOCUMENTS

| JP | 10-70048 A | 3/1998 |
| JP | 10-070048 A | 3/1998 |
| JP | 2005-78943 A | 3/2005 |
| WO | WO-2005/117043 A1 | 12/2005 |
| WO | WO-2005/124801 A1 | 12/2005 |

* cited by examiner

*Primary Examiner* — Mark Kopec
*Assistant Examiner* — Jaison P Thomas
(74) *Attorney, Agent, or Firm* — Birch, Stewart, Kolasch & Birch, LLP

(57) ABSTRACT

Composite particles for an electrochemical device electrode containing an electrode active material, a conductive material, and a binder, wherein primary particles of the composite particles have a volume average particle size of 1 to 500 μm and, when a relative particle amount of the primary particles having a particle size of a fine range near a mode radius R1 of the primary particles in the particle size distribution of the primary particles of the composite particles found by the volume standard is ρ1 and a relative particle amount of secondary particles having a particle size of the fine range in the particle size distribution of the secondary particles of the composite particles found by the volume standard in measurement at 23° C. is ρ2, ρ2/ρ1 is 0.03 to 0.60.

8 Claims, 1 Drawing Sheet ic particles and electrode materials can no longer be supplied fast enough to keep up with the speed of formation, so it is difficult to form an active material layer superior in precision of thickness and having a uniform, large thickness with a good productivity.

Therefore, the present invention has as its object the provision of composite particles for an electrochemical device electrode enabling an electrochemical device electrode superior in precision of thickness and having a uniform, large thickness to be obtained at a fast speed of formation when forming an active material layer by roll press forming or other continuous press forming, a method of production of the composite particles, and an electrochemical device electrode formed by the above method of production.

The inventor took note of the powder properties of the composite particles and studied them in depth. As a result, the inventor discovered that the ratio of secondary agglomeration of the composite particles has a great effect on the formability of the active material layer. Further, the inventor discovered that when the relative particle amount of primary particles having a particle size of a fine range near a mode radius R1 in the distribution of particle size of the primary particles of the composite particles found by the volume standard is $\rho1$ and the relative particle amount of the secondary particles having a particle size of the fine range in the distribution of particle size of the secondary particles of the composite particles found by the volume standard in measurement at 23° C. is $\rho2$, a value of $\rho2/\rho1$ is suitable as the value showing the ratio of secondary agglomeration. Further, the inventor discovered that when $\rho2/\rho1$ is in a certain range, if forming the active material layer by roll press forming or other continuous press forming, it is possible to obtain an electrochemical device electrode having an active material layer superior in precision of thickness and having a uniform, large thickness by a fast speed of formation (hereinafter, this performance sometimes being referred to as "high speed roll press formability") and completed the present invention based on these discoveries.

According to a first aspect of the present invention, there is provided composite particles for an electrochemical device electrode containing an electrode active material, a conductive material, and a binder, wherein primary particles of the composite particles have a volume average particle size of 1 to 500 μm and, when a relative particle amount of the primary particles having a particle size of a fine range near a mode radius R1 of the primary particles in a particle size distribution of the primary particles of the composite particles found by the volume standard is $\rho1$ and a relative particle amount of secondary particles having a particle size of the fine range in a particle size distribution of the secondary particles of the composite particles found by the volume standard in measurement at 23° C. is $\rho2$, $\rho2/\rho1$ is 0.03 to 0.60.

Here, "secondary particles" means the large agglomerated particles formed by several composite particles (primary particles) agglomerating. Further, "mode radius" means the particle size with the greatest rate of presence of particles and the particle size showing the maximum value on the particle size distribution curve, while the "mode radius R1" means the mode radius of the primary particles of the composite particles.

Further, "$\rho1$" means the ratio (%) of primary particles having a particle size of a fine range near the mode radius R1 based on the particle amount of the primary particles as a whole as a standard (100%). Further, "$\rho2$" means the ratio (%) of secondary particles having a particle size of the fine range based on the particle amount of the secondary particles as a whole as a standard (100%).

COMPOSITE PARTICLES FOR ELECTROCHEMICAL DEVICE ELECTRODE, METHOD OF PRODUCTION OF COMPOSITE PARTICLES FOR ELECTROCHEMICAL DEVICE ELECTRODE, AND ELECTROCHEMICAL DEVICE ELECTRODE

TECHNICAL FIELD

The present invention relates to composite particles for an electrochemical device electrode for producing an electrode suitably used for an electric double layer capacitor etc., a method of production of such composite particles for an electrochemical device electrode, and an electrochemical device electrode using the composite particles for an electrochemical device electrode.

BACKGROUND ART

Small sized, light weight, high energy density and repeatedly rechargeable lithium ion secondary cells, electric double layer capacitors, and other electrochemical devices are rapidly growing in demand due to their properties. Lithium ion secondary cells are being utilized in mobile phones, notebook type personal computers, and other fields due to their relatively large energy density, while electric double layer capacitors can be rapidly charged and discharged, so are being utilized as small sized power supplies for memory backup of personal computers etc. Furthermore, electric double layer capacitors are promising in terms of application as large power supplies for electric vehicles. Further, redox capacitors utilizing an oxidation reduction reaction of the surface of metal oxides or a conductive polymer (pseudo electric double layer capacitor capacity) are also gathering attention due to the size of their capacities.

These electrochemical devices are being asked to be improved much more such as being reduced in resistance, increased in capacity, and improved in mechanical properties and productivity along with the expansion and development of their applications. Among these, methods of production of electrochemical device electrodes higher in productivity are also being sought. Various improvements are being made to methods of production enabling high speed formation and electrochemical device electrode materials complying with these methods of production.

Electrochemical device electrodes generally are made of an active material layer comprising activated carbon, lithium metal oxide, graphite, a metal alloy, or other electrode active material and a conductive material bonded by a binder all laminated on a current collector. As the method of forming this active material layer, Japanese Patent Publication (A) No. 2005-78943 (U.S. Patent Publication No. 2005-064096A) describes press forming composite particles comprised of a particulate electrode active material and particulate conductive aid bonded by a binder. Further, WO2005/124801 describes a method of press forming an electrode material comprised of spherical particles including an electrode active material and thermoplastic binder.

DISCLOSURE OF THE INVENTION

However, if trying to form an active material layer using the composite particles described in Japanese Patent Publication (A) No. 2005-78943 and the electrode material described in WO2005/124801 by roll press forming or other continuous press forming, if raising the speed of formation, the compos- Further, the composite particles for an electrochemical device electrode according to a first aspect of the present invention preferably further contains a dispersant.

Further, according to a second aspect of the present invention, there is provided a method of production of composite particles for an electrochemical device electrode according to the first aspect of the present invention having a step (i) of dispersing or dissolving an electrode active material, a conductive material, and a binder in water to obtain a slurry A, a step (ii) of adjusting pH of the slurry A to 8.0 to 10.0, and a step (iii) of spray drying the slurry A for granulation (iii).

Further, according to a third aspect of the present invention, there is provided a method of production of composite particles for an electrochemical device electrode according to a first aspect of the present invention having a step (I) of dispersing an electrode active material and a binder in a solvent to obtain a slurry B, a step (II) of spray drying the slurry B for granulation to obtain granulated particles, and a step (III) of covering at least part of the surface of the granulated particles with a conductive material with a volume average particle size smaller than the granulated particles. Further, in a method of production of composite particles for an electrochemical device electrode according to the third aspect of the present invention, the binder preferably includes polytetrafluoroethylene.

Further, according to a fourth aspect of the present invention, there is provided an electrochemical device electrode having a current collector and an active material layer laminated over the current collector, the electrochemical device electrode formed by press forming the composite particles for an electrochemical device electrode according to the first aspect of the present invention.

The press forming in the electrochemical device electrode according to this fourth aspect is preferably roll press forming. Further, the electrochemical device electrode according to the fourth aspect is preferably used for an electric double layer capacitor.

BEST MODE FOR CARRYING OUT THE INVENTION

Figure 1:
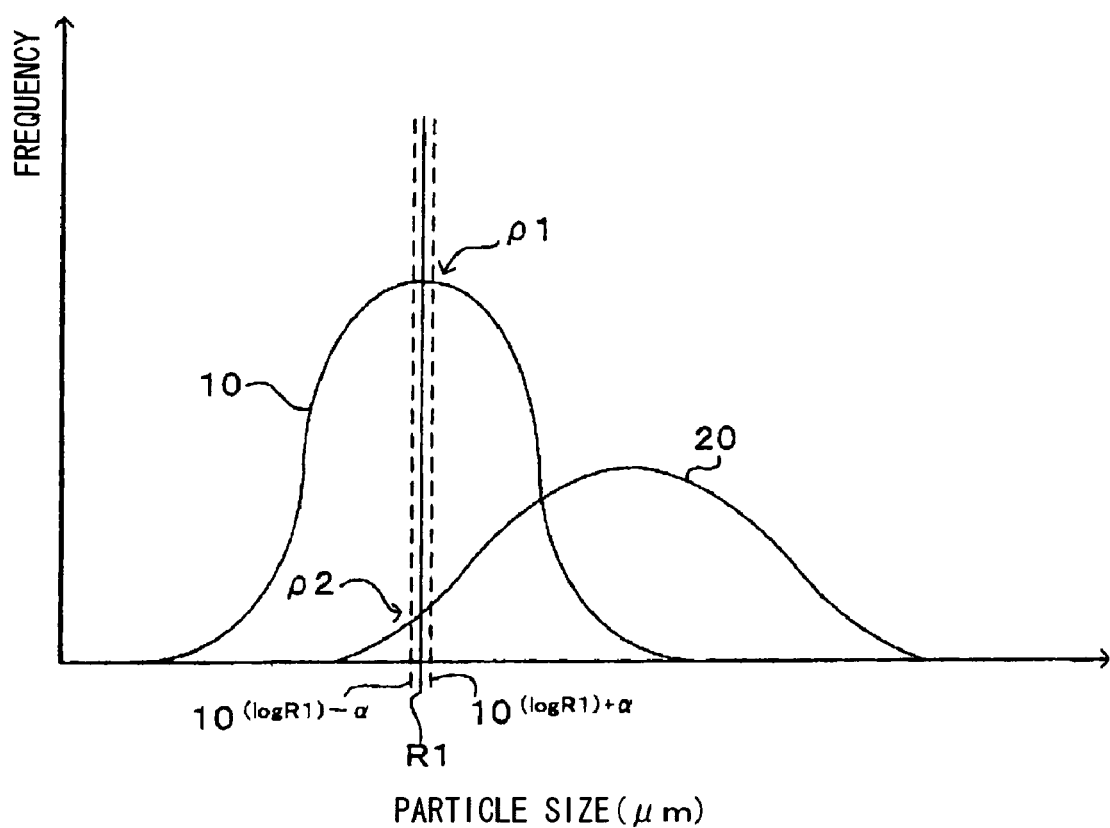
FIG. 1 is a view showing the general relationship between $\rho 1$ and $\rho 2$.

The composite particles for an electrochemical device electrode of the present invention contain an electrode active material, conductive material, and binder, have a volume average particle size of the primary particles of 1 to 500 μm, and, when the relative particle amount of the primary particles having a particle size of a fine range near a mode radius R1 of the primary particles in the particle size distribution of the primary particles of the composite particles found by the volume standard is $\rho 1$ and a relative particle amount of secondary particles having a particle size of the fine range in the particle size distribution of the secondary particles of the composite particles found by the volume standard in measurement at 23° C. is $\rho 2$, have $\rho 2/\rho 1$ of 0.03 to 0.60.

<Electrode Active Material>

The electrode active material forming the composite particles of the present invention is suitably selected according to the type of the electrochemical device. As the electrode active material for the positive electrode of a lithium ion secondary cell, $LiCoO_2$, $LiNiO_2$, $LiMnO_2$, $LiMn_2O_4$, $LiFePO_4$, $LiFeVO_4$, and lithium-containing composite metal oxides in which parts of these elements are substituted; $TiS_2$, $TiS_3$, amorphous $MoS_3$, and other transition metal sulfides; and $Cu_2V_2O_3$, amorphous $V_2O.P_2O_5$, $MoO_3$, $V_2O_5$, $V_6O_{13}$, and other transition metal oxides may be mentioned. Furthermore, polyacetylene, poly-p-phenylene, and other conductive polymers may be mentioned.

As the electrode active material for the negative electrode of a lithium ion secondary cell, for example, amorphous carbon, graphite, natural graphite, mezocarbon microbeads (MCMB), and pitch-based carbon fiber and other carbon materials; polyacene and other conductive polymers; Si, Sn, Sb, Al, Zn, and W able to alloy with lithium, etc. may be mentioned.

As the electrode active material for the electric double layer capacitor, usually an allotrope of carbon is used. The electrode active material for an electric double layer capacitor is preferably one with a large specific surface area enabling formation of an interface of a larger area even with the same mass. Specifically, the specific surface area is 30 $m^2/g$ or more, preferably 500 to 5,000 $m^2/g$, more preferably 1,000 to 3,000 $m^2/g$ in range. As specific examples of the allotrope of carbon, activated carbon, polyacene, carbon whiskers, graphite, etc. may be mentioned. These powders or fibers can be used. The preferable electrode active material for the electric double layer capacitor is activated carbon. Specifically, a phenol-based, a rayon-based, acryl-based, pitch-based, palm shell-based, or other activated carbon may be mentioned. These carbonaceous materials may be used as the electrode active material for an electric double layer capacitor alone or in combinations of two or more types.

Further, as the electrode active material for the electric double layer capacitor, it is possible to use nonporous carbon having microcrystalline carbon similar to graphite and increased in interlayer distance of this microcrystalline carbon. Such a nonporous carbon is obtained by dry distilling easy graphite-forming carbon with highly developed multilayer graphite structure microcrystals at 700 to 850° C., then heat treating it together with caustic alkali at 800 to 900° C., and further removing the residual alkali ingredient by heated steam in accordance with need.

The volume average particle size of the electrode active material is 0.1 to 100 μm, preferably 1 to 50 μm, more preferably 3 to 35 μm. If the volume average particle size is in this range, formation of the electrode is easy and the capacity can be raised, so this is preferable. The above electrode active material may be used alone or in combinations of two or more types in accordance with the type of the electrochemical device. When using a combination of electrode active materials, it is also possible to use a combination of two or more types of electrode active materials differing in average particle size or particle size distribution. Further, if reducing the volume average particle size of the electrode active material, reduction of the volume average particle size of the composite particles becomes easy.

<Conductive Material>

The conductive material forming the composite particles of the present invention is comprised of allotropes of particle-shaped carbon not having any pores having conductivity and able to form an electric double layer capacitor and improves the conductivity of the electrochemical device electrode. Specifically, furnace black, acetylene black, Ketjen Black (registered trademark of AkzoNobel Chemicals by), and other conductive carbon black; natural graphite, artificial graphite, or other graphite; polyacrylonitrile-based carbon fiber, pitch-based carbon fiber, vapor-phase carbon fiber, and other carbon fibers may be mentioned. Among these, conductive carbon black is preferable, while acetylene black and Ketjen Black are more preferable. The volume average particle size of the conductive material is preferably smaller than the volume average particle size of the electrode active material and is usually 0.001 to 10 μm, preferably 0.05 to 5 μm, more preferably 0.01 to 1 μm in range. If the particle size of the conductive material is in this range, high conductivity is obtained by a smaller amount of use. These conductive materials may be used alone or in any combination of two or more types.

The amount of conductive material in the composite particles is, with respect to 100 parts by mass of the electrode active material, normally 0.1 to 50 parts by mass, preferably 0.5 to 15 parts by mass, more preferably 1 to 10 parts by mass in range. By using composite particles containing this range of amount of conductive material to form an electrode, it is possible to raise the capacity of the electrochemical device and lower the internal resistance.

<Binder>

The binder used in the present invention is a compound having a bonding ability. It is not particularly limited if such a compound. For example, a fluorine-based polymer, diene-based polymer, acrylate-based polymer, polyimide, polyamide, polyurethane, or another polymer compound may be mentioned. Among these, due to the superior balance of the bondability with the current collector and property of internal resistance of the obtained electrode, a fluorine-based polymer, diene-based polymer, and acrylate-based polymer are preferable. These binders may be used alone or in any combination of two or more types.

A fluorine-based polymer is a polymer containing monomer units containing fluorine atoms. As specific examples of the fluorine-based polymer, polytetrafluoroethylene, polyvinylidene fluoride, a tetrafluoroethylene-perfluoroalkyl vinyl ether copolymer, an ethylene-tetrafluoroethylene copolymer, an ethylene-chlorotrifluoroethylene copolymer, and a perfluoroethylene-propene copolymer may be mentioned. Preferably it is polytetrafluoroethylene. If using polytetrafluoroethylene as the binder, this is fibrillated to facilitate holding of the electrode active material.

The diene-based polymer is a homopolymer of a conjugated diene or a copolymer obtained by polymerization of a monomer mixture including a conjugated diene or hydrogenates of the same. The ratio of the conjugated diene in the monomer mixture is usually 40 mass % or more, preferably 50 mass % or more, more preferably 60 mass % or more. As specific examples of the diene-based polymer, polybutadiene, polyisoprene, or other conjugated diene homopolymers; carboxy-modifiable styrene-butadiene copolymer (SBR), or other aromatic vinyl-conjugated diene copolymers; an acrylonitrile-butadiene copolymer (NBR) or other vinyl cyanide-conjugated diene copolymer; hydrogenated SBR, hydrogenated NBR, etc. may be mentioned.

The acrylate-based polymer is a homopolymer of an acrylic acid ester or a methacrylic acid ester or a copolymer obtained by polymerization of a monomer mixture containing the same. As the acrylic acid ester or methacrylic acid ester, an alkyl ester is preferably used. As the alkyl group of the alkyl ester, a $C_1$ to $C_{18}$ one is preferable.

As specific examples of the acrylic acid ester, methyl acrylate, ethyl acrylate, propyl acrylate, isopropyl acrylate, n-butyl acrylate, isobutyl acrylate, cyclohexyl acrylate, 2-ethylhexyl acrylate, isopentyl acrylate, isooctyl acrylate, isobonyl acrylate, isodecyl acrylate, lauryl acrylate, stearyl acrylate, tridecyl acrylate, and other acrylate alkyl esters; butoxyethyl acrylate, ethoxydiethyleneglycol acrylate, methoxydipropyleneglycol acrylate, methoxypolyethyleneglycol acrylate, phenoxyethyl acrylate, tetrahydrofurfuryl acrylate, and other acrylic acid esters containing ether groups; 2-hydroxyethyl acrylate, 2-hydroxypropyl acrylate, 2-hydroxy-3-phenoxypropyl acrylate, 2-acryloyloxyethyl-2-hydroxyethylphthalic acid, or other acrylic acid esters containing hydroxyl groups; 2-acryloyloxyethyl phthalic acid, 2-acryloyloxyethyl phthalic acid, or other carboxylic acid-containing acrylic acid esters; perfluorooctylethyl acrylate and other fluorine-group containing acrylic acid esters; ethyl acrylate phosphate and other phosphoric acid group-containing acrylic acid esters; glycidyl acrylate and other epoxy group-containing acrylic acid esters; dimethylaminoethyl acrylate and other amino group-containing acrylic acid esters may be mentioned.

As specific examples of methacrylic acid esters, methyl methacrylate, ethyl methacrylate, propyl methacrylate, isopropyl methacrylate, n-butyl methacrylate, isobutyl methacrylate, cyclohexyl methacrylate, 2-ethylhexyl methacrylate, isopentyl methacrylate, isooctyl methacrylate, isobonyl methacrylate, isodecyl methacrylate, lauryl methacrylate, tridecyl methacrylate, stearyl methacrylate, and other methacrylic acid alkyl esters; butoxyethyl methacrylate, ethoxydiethyleneglycol methacrylate, methoxydipropyleneglycol methacrylate, methoxypolyethyleneglycol methacrylate, butoxyethyl methacrylate, tetrahydrofurfuryl methacrylate and other ether group-containing methacrylic acid esters; 2-hydroxyethyl methacrylate, 2-hydroxypropyl methacrylate, 2-hydroxy-3-phenoxypropyl methacrylate, 2-methacryloyloxyethyl-2-hydroxyethyl phthalic acid, and other hydroxyl-group containing methacrylic acid esters; 2-methacryloyloxyethyl phthalic acid and other carboxylic acid-containing methacrylic acid esters; perfluoroctylethyl methacrylate and other fluorine-group containing methacrylic acid esters; ethyl methacrylate phosphate or other phosphoric acid group-containing methacrylic acid esters; glycidyl methacrylate or other epoxy-group containing methacrylic acid esters; dimethylaminoethyl methacrylate or other amino group-containing methacrylic acid esters; etc. may be mentioned.

These acrylic acid (or methacrylic acid) esters may be used alone or in any combination of two or more types. Further, the acrylate-based polymer may be a copolymer obtained by polymerization of a monomer mixture including an acrylic acid (or methacrylic acid) ester, but the content of the acrylic acid (or methacrylic acid) ester in this monomer mixture is usually 50 mass % or more, preferably 60 to 99 mass %, more preferably 70 to 97 mass %.

As the other monomer able to copolymerize with the acrylic acid (or methacrylic acid) ester in the monomer mixture, an α,β-unsaturated nitrile compound, crotonic acid ester, unsaturated carboxylic acid, and carboxylic acid ester having two or more carbon-carbon double bonds may be mentioned. As specific examples of α,β-unsaturated nitrile compounds, acrylonitrile and methacrylonitrile may be mentioned. The content of the α,β-unsaturated nitrile compound in the acrylate-based polymer is preferably 30 mass % or less.

As specific examples of the crotonic acid ester, methyl crotonate, ethyl crotonate, propyl crotonate, butyl crotonate, isobutyl crotonate, and 2-ethylhexyl crotonate may be mentioned. The content of the crotonic acid ester in the acrylate-based copolymer is preferably 3 mass % or less.

As specific examples of unsaturated carboxylic acids, acrylic acid, methacrylic acid, crotonic acid, isocrotonic acid, maleic acid, fumaric acid, citraconic acid, mesaconic acid, glutaconic acid, and itaconic acid may be mentioned. The content of the unsaturated carboxylic acid in the acrylate-based copolymer is preferably 0.1 to 10 mass %, more preferably 1 to 5 mass %.

As specific examples of a carboxylic acid ester having two or more carbon-carbon double bonds, ethyleneglycol dimethacrylate, diethyleneglycol dimethacrylate, acryl methacrylate, and trimethylolpropane trimethacrylate may be mentioned. The content of the carboxylic acid ester having two or more carbon-carbon double bonds in the monomer composition is preferably 0.1 to 10 mass %, more preferably 1 to 5 mass %.

Further, as another monomer able to copolymerize with an acrylic acid (or methacrylic acid) ester, furthermore, styrene or another aromatic vinyl compound; 1,3-butadiene, isoprene, or another conjugated diene; and ethylene or propylene or another 1-olefin may be mentioned. The total of the content of these monomers in the monomer composition is preferably 20 mass % or less, more preferably 10 mass % or less.

The binder used in the present invention preferably has a glass transition temperature. The glass transition temperature is usually −80° C. to +180° C., preferably −80° C. to +40° C., more preferably −60° C. to +20° C. The lower the binder in glass transition temperature, the easier the secondary agglomeration of the composite particles and the smaller the value of $\rho 2/\rho 1$, so the value of $\rho 2/\rho 1$ can be adjusted by the type of the binder used.

The shape of the binder used in the present invention is not particularly limited, but to improve the bondability and to suppress to a minimum a drop in the capacity of the electrode and an increase in the internal resistance, a particle shape is preferable. As a particle shape binder, for example, one like a latex in a state with the particles of the binder dispersed in a solvent or one of a powder obtained by drying the dispersion liquid may be mentioned.

When the binder is comprised of particles, the particle size is not particularly limited, but usually it is 0.001 to 100 μm, preferably 0.01 to 10 μm, more preferably 0.05 to 1 μm in volume average particle size. When the binder has an average particle size in this range, a superior bonding strength can be given to the active material layer even with use of a small amount of binder.

Further, the method of production of the binder used in the present invention is not particularly limited. The emulsion polymerization method, suspension polymerization method, dispersion polymerization method, solution polymerization method, or other known polymerization method may be employed. Among these, production by the emulsion polymerization method is preferable since control of the particle size of the binder is easy. Further, the binder used in the present invention may be particles having a core-shell structure obtained by step-by-step polymerization of a mixture of two or more types of monomers.

The amount of the binder in the composite particles is, with respect to 100 parts by mass of the electrode active material, usually 1 to 20 parts by mass, preferably 3 to 15 parts by mass in range. The greater the amount of the binder used, the easier the secondary agglomeration of the composite particles, so it is possible to adjust $\rho 2/\rho 1$ by the amount of the binder.

<Dispersant>

The composite particles of the present invention may contain a dispersant in addition to the above. The dispersant is a resin soluble in a solvent. Preferably, at the time of preparation of the later explained slurry, this is used dissolved in a solvent and has the action of uniformly dispersing the electrode active material, conductive material, etc. in the solvent. As the dispersant, carboxymethyl cellulose, methyl cellulose, ethyl cellulose, hydroxypropyl cellulose, and hydroxypropylmethyl cellulose or other cellulose-based polymers, and these ammonium salts or alkali metal salts; ammonium salt or alkali metal salt of a polyacrylic acid or polymethacrylic acid; polyvinyl alcohol, modified polyvinyl alcohol, polyethylene oxide; polyvinyl pyrrolidone, polycarbonic acid, starch oxide, starch phosphate, caseine, various types of modified starches, chitin, chitosan derivatives, etc. may be mentioned. These dispersants may be used alone or in combinations of two or more types. Among these, as the dispersant, a cellulose-based polymer is preferable. Carboxymethyl cellulose or its ammonium salt or alkali metal salt is particularly preferred. The amount of the dispersant used is not particularly limited, but in the composite particles, it is usually, with respect to 100 parts by mass of the electrode active material, 0.1 to 10 parts by mass, preferably 0.5 to 5 parts by mass, more preferably 0.8 to 2.5 parts by mass in range. By using the dispersant, it is possible to suppress the precipitation and agglomeration of the solids in the slurry. The greater the dispersant, the easier the secondary agglomeration of the composite particles, so it is possible to adjust the $\rho 2/\rho 1$ by the amount of dispersant.

<Other Additives>

The composite particles of the present invention may also contain other additives in accordance with need. As the other additives, for example, there are surfactants. As surfactants, anionic, cationic, nonionic, nonionic-anionic, and other amphoteric surfactants may be mentioned. Among these, anionic or nonionic surfactants which easily break down under heat are preferable. The amount of the surfactant is not particularly limited, but in the composite particles, it is, with respect to 100 parts by mass of the electrode active material, 0 to 50 parts by mass, preferably 0.1 to 10 parts by mass, more preferably 0.5 to 5 parts by mass in range. The greater the amount of addition of the surfactant, the more difficult the secondary agglomeration of the composite particles, so it is possible to use the amount of the surfactant to adjust the $\rho 2/\rho 1$.

<Volume Average Particle Size of Primary Particles>

The composite particles of the present invention have a volume average particle size of the primary particles of 1 to 500 μm, preferably 5 to 300 μm, more preferably 10 to 100 μm, most preferably 20 to 75 μm in range. If the primary particles have a volume average particle size in this range, composite particles superior in high speed roll press forming can be obtained. The smaller the primary particles of the composite particles in volume average particle size, the easier the secondary aggregation of the composite particles of the primary particles and the smaller the $\rho 2/\rho 1$ explained below. The volume average particle size of the primary particles of the composite particles can be measured by using a laser diffraction type granularity distribution measurement device and spraying composite particles pressurized by compressed air. Note that the "primary particles" mean the minimum units of solids able to be clearly separated from another in the particles forming the powder.

<Relationship Between $\rho 1$ and $\rho 2$ in Mode Radius R1>

In the composite particles of the present invention, when the relative particle amount of the primary particles having a particle size of the fine range near the mode radius R1 of the primary particles in the particle size distribution of the primary particles of the composite particles found by the volume standard is $\rho 1$ and the relative particle amount of the secondary particles having a particle size of the fine range in the particle size distribution of the secondary particles of the composite particles found by the volume standard at measurement at 23° C. is $\rho 2$, $\rho 2/\rho 1$ is 0.03 to 0.60. $\rho 2/\rho 1$ is preferably 0.03 to 0.30. When the agglomerability of the composite particles expressed by $\rho 2/\rho 1$ is in this range, when using the composite particles of the present invention to form an active material layer by roll press forming or other continuous press forming, it is possible to sufficiently supply powder even if raising the forming speed and it is possible to obtain an electrochemical device electrode having an active material layer superior in thickness precision and having a uniform, large thickness by a fast forming speed. Note that the "secondary particles" mean large agglomerated particles formed by several primary particles agglomerating. Further, the "mode radius" means the particle size with the largest probability of presence of particles and means the particle size of the maximum value on the particle size distribution curve.

Further, a "fine range near R1" is given as a range of a particle size of $10^{(\log R1)-\alpha}$ (μm) to less than $10^{(\log R1)+\alpha}$ (μm) when finding the mode radius R1 (μm) as the particle size exhibiting the maximum value on a primary particle distribution curve when drawing a particle size distribution curve having the primary particle size (μm) on the abscissa and the frequency on the ordinate. The value of α can be set in accordance with the value of R1, the measurement precision of the particle size measurement device, etc. Due to this, while the values of ρ1 and ρ2 also fluctuate, if α is sufficiently small compared with the range of distribution of primary particle size and secondary particle size, the value of ρ2/ρ1 becomes substantially constant regardless of the value of α. α is preferably 0.05 or less, more preferably 0.03 or less. In the examples of the present invention, as α, 0.02389 was used.

FIG. 1 shows ρ1 and ρ2. In FIG. 1, the ordinate shows the frequency while the abscissa shows the particle size (μm). The curve 10 is the particle size distribution curve of the primary particles of the composite particles found by the volume standard. The particle size at the maximum value of the particle size distribution curve 10 of the primary particles is the mode radius R1. Further, the relative particle amount of the primary particles having a particle size in the fine range near this mode radius R1 is made ρ1. Here, the "relative particle amount ρ1" is the ratio (%) of primary particles having a particle size in the fine range near the mode radius R1 in the case based on the amount of primary particles as a whole as a standard (100 vol %). In FIG. 1, the relative particle amount ρ1 is a value expressed by the ratio of the area of the fine range near R1 in the projecting shape with respect to the area of the projecting shape surrounded by the particle size distribution curve 10 of the primary particles and the abscissa.

Further, the curve 20 is the particle size distribution curve of the secondary particles of the composite particles found by the volume standard. The secondary particles are large particles formed by agglomeration of the primary particles, so the particle size distribution curve 20 of the secondary particles is distributed at the large particle size side compared to the primary particles. The "relative particle amount ρ2" of the secondary particles means the relative particle amount of the secondary particles having a particle size of the fine range. That is, the "relative particle amount ρ2" is the ratio (%) of the secondary particles having the particle size of the fine range in the case based on the amount of the secondary particles as a whole as a standard (100 vol %). In FIG. 1, the relative particle amount ρ2 is a value expressed by the ratio of the area of the fine range near R1 in the projecting shape surrounded by the particle size distribution curve 20 of the secondary particles with respect to the projecting shape and the abscissa. Note that the particle size distribution curves 10, 20 shown in FIG. 1 are for explaining the concepts of ρ1 and ρ2 and do not show the actual particle size distribution of the composite particles.

The volume average particle size distribution of the primary particles can be measured by using a laser diffraction type granularity distribution measurement device and spraying the composite particles under pressure by compressed air.

Further, the volume average particle size distribution of the secondary particles can be measured for example by using a laser diffraction type granularity distribution measurement device and allowing the composite particles to naturally drop under a temperature condition of 23° C.

<Method of Production of Composite Particles for Electrochemical Device Electrode>

The composite particles for an electrochemical device electrode of the present invention are not particularly limited by the method of production, but according to the method of production (spray dry granulation method) explained next, the composite particles of the present invention can be easily obtained, so this is preferable.

The first method of production of the composite particles for an electrochemical device electrode of the present invention has a step of obtaining a slurry A containing an electrode active material, conductive material, and binder and a step of spray drying this slurry A for granulation. Below, these steps will be explained.

(Step of Obtaining Slurry A)

At step (i) for obtaining the slurry A, the above-mentioned electrode active material, conductive material, binder, and, in accordance with need, dispersant and other additives are dispersed or dissolved in a solvent to obtain a slurry A comprised of the electrode active material, conductive material, binder, and, in accordance with need, dispersant and other additives dispersed or dissolved in it.

The solvent used for obtaining the slurry A is not particularly limited, but when using the above dispersant, a solvent able to dissolve the dispersant is preferably used. Specifically, usually water is used, but an organic solvent can also be used. A mixed solvent of water and an organic solvent can also be used. As the organic solvent, for example, methyl alcohol, ethyl alcohol, propyl alcohol, or other alkyl alcohols; acetone, methylethylketone, or other alkyl ketones; tetrahydrofuran, dioxanes, digrime, or other ethers; diethylformamide, dimethylacetoamide, N-methyl-2-pyrrolidone, dimethylimidazolidinone, or other amides; dimethyl sulfoxide, sulforane, or other sulfur-based solvents; etc. may be mentioned. Among these, as organic solvents, alcohols are preferable. If using water and an organic solvent with a boiling point less than water together, the drying speed at the time of spray drying can be increased. Further, the dispersability of the binder or the solubility of the dispersant changes depending on the amount or type of the organic solvent used together with the water. Due to this, it is possible to adjust the viscosity or fluidity of the slurry A and improve the production efficiency.

The amount of the solvent used when preparing the slurry A is the amount whereby the solids concentration of the slurry A is usually 1 to 50 mass %, preferably 5 to 50 mass %, more preferably 10 to 30 mass % in range. When the solids concentration is in this range, the binder uniformly disperses, so this is preferable. Further, the larger the solids concentration of the slurry A, the larger the primary volume average particle size of the composite particles, so it is possible to adjust the solids concentration of the slurry A to adjust ρ2/ρ1.

The viscosity of the slurry A at room temperature is usually 10 to 3,000 mPa·s, preferably 30 to 1,500 mPa·s, more preferably 50 to 1,000 mPa·s in range. If the viscosity of the slurry A is in this range, it is possible to raise the productivity of the spray dry granulation step. The higher the viscosity of the slurry A, the larger the sprayed droplets and the larger the primary volume average particle size of the composite particles. For this reason, it is possible to adjust the viscosity of the slurry A to adjust the ρ2/ρ1.

When the solvent of the slurry A is water, there is preferably a step (ii) of adjusting the pH. The pH of the slurry A is preferably 8.0 to 10.0, more preferably 8.2 to 10.0, most preferably 8.5 to 9.5 in range. If the pH of the slurry A is in this range, it becomes easy to obtain composite particles with the $\rho 2/\rho 1$ in the above range. The pH of the slurry A is affected by the properties of the electrode active material used and is usually 3 to 12 in range. When adjusting the pH of the slurry A, when raising the pH, ammonia water is preferably used, while when lowering the pH, acetic acid or sulfuric acid is preferably used.

The method or procedure for dispersing or dissolving the electrode active material, conductive material, binder, dispersant, and other additives to the solvent is not particularly limited. For example, the method of adding the electrode active material, conductive material, binder, and dispersant to the solvent, the method of dissolving a dispersant in a solvent, then adding and mixing in a binder dispersed in a solvent (for example, latex), and finally adding and mixing an electrode active material and conductive material, the method of adding and mixing an electrode active material and conductive material to a binder dispersed in a solvent and adding and mixing a dispersant dissolved in a solvent to this mixture, etc. may be mentioned. As the means for mixture, for example, a ball mill, sand mill, beads mill, pigment disperser, kneader, ultrasonic disperser, homogenizer, homomixer, planetary mixer, or other mixing apparatus may be mentioned. The mixing is usually performed at room temperature to 80° C. in range for 10 minutes to several hours.

(Spray Drying Step)

Next, in the step (iii) of spray drying the slurry A for granulation, the slurry A is spray dried for granulation. The spray drying method is the method of spraying the slurry in hot air to dry it. As the device used for spraying the slurry, an atomizer may be mentioned. Atomizers come in two types: the rotary disk system and the pressure system. The rotary disk system introduces the slurry to the substantial center of a high speed rotating disk. The centrifugal force of the disk causes the slurry to be thrown out to the outside of the disk. At that time, the slurry is atomized. The rotary speed of the disk depends on the size of the disk, but is usually 5,000 to 30,000 rpm, preferably 15,000 to 30,000 rpm. The lower the rotary speed of the disk, the larger the sprayed droplets and the larger the primary volume average particle size of the composite particles. As a rotary disk type atomizer, a pin type and vane type may be mentioned, but preferably it is a pin type atomizer. A pin type atomizer is a type of centrifugal atomization device using a spray disk. The spray disk is comprised of upper and lower mounting disks between which a plurality of spray tumblers are attached substantially concentrically along the periphery. The slurry A is introduced from the center of the spray disk, deposits on spray tumblers by centrifugal force, moves on the tumbler surfaces to the outside, and finally leaves the tumbler surfaces to be sprayed outside. On the other hand, the press system is a system pressing the slurry A and spraying it from a nozzle for drying.

The temperature of the slurry A sprayed is normally room temperature, but the slurry may also be warmed to more than room temperature. Further, the hot air temperature at the time of spray drying is usually 80 to 250° C., preferably 100 to 200° C. In the spray drying method, the method of blowing the hot air is not particularly limited. For example, a system where the hot air and spray direction are in parallel in the horizontal direction, a system where the slurry is sprayed at the top of a drying tower and descends together with the hot air, a system where the sprayed droplets and hot air flow in opposite directions and contact each other, a system where the sprayed droplets first flow in parallel with the hot air, then descend by gravity and flow in an opposite direction for contact, etc. may be mentioned.

The composite particles for an electrochemical device electrode produced by the above method of production or another method can be controlled in $\rho 2/\rho 1$ by post treatment after production of the particles in accordance with need. As a specific example, to increase the $\rho 2/\rho 1$, it is possible to heat and dry the particles to remove the residual solvent, while conversely to reduce the $\rho 2/\rho 1$, it is possible to add a small amount of solvent to the composite particles, expose the composite particles to steam, add a binder, etc.

Next, a second method of production of the composite particles for an electrochemical device electrode of the present invention will be explained. This second method of production has a step (I) of dispersing an electrode active material and binder in a solvent to obtain a slurry B, a step (II) of spraying drying this slurry B for granulation to obtain granulated particles, and a step (III) of covering at least part of the surface of the granulated particles by a conductive material with a smaller volume average particle size than the granulated particles. Below, each step will be explained.

<Preparation of Slurry>

In step (I), the above-mentioned electrode active material, binder, and, in accordance with need, the dispersant, conductive material, and other additives are dispersed or dissolved in the solvent to obtain the slurry B in which the electrode active material, binder, and, in accordance with need, the dispersant, conductive material, and other additives are dispersed or dissolved. In this second method of production, the binder is preferably a fluorine-based polymer.

The solvent used for obtaining the slurry B is not particularly limited, but when using the above dispersant, a solvent able to dissolve the dispersant is preferably used. Specifically, usually water is used, but an organic solvent may also be used. A mixed solvent of water and an organic solvent may also be used. As the organic solvent, an organic solvent similar to the above first method of production may be mentioned. Further, as the organic solvent, alcohols are preferable. If using water and an organic solvent with a boiling point lower than water together, at the time of spray drying, it is possible to increase the drying speed. Further, depending on the amount or type of the organic solvent used together with the water, the dispersability of the binder or the solubility of the dispersant changes. Due to this, it is possible to adjust the viscosity or fluidity of the slurry B and possible to improve the production efficiency.

The amount of the solvent used when preparing the slurry B is the amount whereby the solids concentration of the slurry B usually becomes 1 to 50 mass %, preferably 5 to 50 mass %, more preferably 10 to 30 mass % in range. When the solids concentration is in this range, the binder uniformly disperses, so this is preferable.

The method or procedure of dispersing or dissolving the electrode active material, conductive material, binder, dispersant, and other additives in the solvent is not particularly limited. For example, it is possible to use a method similar to the first method of production.

The viscosity of the slurry B at room temperature is normally 10 to 3,000 mPa·s, preferably 30 to 1,500 mPa·s, more preferably 50 to 1,000 mPa·s in range. If the viscosity of the slurry B is in this range, the productivity of step (II) can be raised. Further, the higher the viscosity of the slurry B, the greater the sprayed droplets and the larger the obtained granulated particles in volume average particle size.

A second method of production of the composite particles for an electrochemical device electrode of the present invention has a step (II) of spray drying the slurry B obtained by the step (I) to granulate it and obtain granulated particles.

The spray drying is performed by spraying the slurry B into hot air to dry it. As the apparatus used for spraying the slurry B, an atomizer may be mentioned in the same way as the above first method of production.

The temperature of the sprayed slurry B is usually room temperature, but the slurry may also be warmed to above room temperature. Further, the hot air temperature at the time of spray drying is usually 80 to 250° C., preferably 100 to 200° C. In spray drying, the method of blowing the hot air is not particularly limited, but for example a system where the hot air and spray direction are in parallel in the horizontal direction, a system where the slurry is sprayed at the top of a drying tower and descends together with the hot air, a system where the sprayed droplets and hot air flow in opposite directions and contact each other, a system where the sprayed droplets first flow in parallel with the hot air, then descend by gravity and flow in an opposite direction for contact, etc. may be mentioned.

Due to the above spray drying, granulated particles are obtained. The granulated particles have a volume average particle size of usually 1 to 500 μm, preferably 5 to 300 μm, more preferably 10 to 100 μm, most preferably 20 to 75 μm in range. Here, the volume average particle size of the granulated particles is measured by using a laser diffraction type granularity distribution measurement apparatus and spraying the granulated particles pressurized by compressed air.

The second method of production of the composite particles for an electrochemical device electrode of the present invention has a step (III) of covering at least part of the surface of the granulated particles obtained at step (II) by a conductive material with a volume average particle size smaller than the granulated particles.

The amount of the conductive material used in step (III) is an amount whereby the amount of the binder becomes usually 1 to 20 mass %, preferably 3 to 15 mass % in range with respect to the total amount of the electrode active material used in step (I) and step (III). Further, it is used so that the total amount of the conductive material used at step (I) and step (III) becomes 0.1 to 50 mass %, preferably 0.5 to 15 mass %, more preferably 1 to 10 mass % in range with respect to the total amount of the electrode active material used at step (I) and step (III). Note that if using a conductive material as the covering material, it is possible to reduce the internal resistance of the electrochemical device produced using the obtained composite particles.

<Coating Step>

At step (III), at least part of the surface of the granulated particles obtained at step (I) is covered by the above conductive material to obtain composite particles. Note that in the present invention, "covered" indicates the conductive material depositing on at least part of the surface of the granulated particles. It is not necessary that the entire surface of the granulated particles be covered. The coating method is not particularly limited, but using the granulated particles and conductive material may be mixed for coating. In particular, it is preferable to mix them by the method of uniform mixing the granulated particles and conductive material and, during the mixing, not applying a strong shear force to the granulated particles so that the granulated particles are not destroyed. The granulated particles obtained by spray drying have the binder present more at the particle surfaces, so even if the shear force at the time of mixing is weak, the conductive material can be bonded to the granulated particles and the surface can be covered. Furthermore, by having the conductive material bonded to the surface of the granulated particles, it is possible to suppress the ratio of secondary agglomeration of the obtained composite particles from becoming excessive.

As the specific mixing method, the container agitation method using a rocking mixer, tumbler mixer, etc. where the container itself is shaken, rotated, or vibrated; mechanical agitation using a mixer with blade, a rotating disk, screw, etc. attached for agitation to a shaft horizontal or vertical to the container, that is, a horizontal cylindrical type mixer, V-type mixer, ribbon type mixer, conical type screw mixer, high speed flow type mixer, rotary disk type mixer, high speed rotating blade mixer, etc.; airflow agitation mixing the powder in a fluid layer utilizing a swirling airflow caused by compressed air; etc. may be mentioned. Further, these mechanisms may be used alone or in combination in a mixer.

Among these, from the viewpoint of productivity, a high speed rotating blade mixer applying a somewhat strong shear force able to shorten the agitation time (for example, a Henschel mixer made by Mitsui Miike Machinery) and airflow agitation enabling continuous coating treatment are preferable. When using a high speed rotating blade mixer (Henschel mixer), the speed is usually 1,000 to 2,500 rpm, preferably 1,500 to 2,000 rpm. If the speed is in this range, it is possible to obtain composite particles uniformly covered with a conductive material on the surface in a short time without breaking the above granulated particle structure. The mixing time is not particularly limited, but is preferably 5 to 20 minutes. The presence of any breakage of the granulated particles and the coverage of the surface by the solid particles "a" can be confirmed by observation under a scanning electron microscope etc.

According to the second method of production of the present invention, it is possible to obtain composite particles for an electrochemical device electrode with at least part of their surfaces covered by a conductive material. By adjusting the type, volume average particle size, amount, etc. of the conductive material, it is possible to adjust the ratio of secondary agglomeration of the obtained composite particles.

<Electrochemical Device Electrode>

The electrochemical device electrode of the present invention (hereinafter sometimes simply referred to as an "electrode") is comprised of an active material layer formed from the electrochemical device composite particles laminated on the current collector.

<Current Collector>

As the material for the current collector used for the electrode, for example, a metal, carbon, conductive polymer, etc. may be used. Preferably, a metal is used. As the metal for the current collector, usually aluminum, platinum, nickel, tantalum, titanium, stainless steel, or another alloy etc. may be used. Among these, from the viewpoint of the conductivity and voltage resistance, aluminum or aluminum alloy is preferably used. Further, when a high voltage resistance is demanded, it is preferable to use the high purity aluminum disclosed in Japanese Patent Publication (A) No. 2001-176757 etc. Specifically, the purity of aluminum is preferably 99.99% or more. The current collector is a film or sheet in shape. The thickness is suitably selected in accordance with the objective of use, but is usually 1 to 200 μm, preferably 5 to 100 μm, more preferably 10 to 60 μm. Further, the sheet shaped current collector may also be expanded metal, punching metal, or shape having pores such as net shape, etc.

The current collector may be treated in advance by a surface chemical treatment or surface roughening treatment in accordance with need to reduce the contact resistance with the active material layer or improve the depositability with the active material layer. As the surface chemical treatment, acid treatment, chromate treatment, etc. may be mentioned. As the surface roughening treatment, electrochemical etching treatment or etching by an acid or alkali may be mentioned.

Further, the current collector used may be one coated on its surface with a conductive coating. The conductive coating is comprised of a conductive material, a binder, and a dispersant added in accordance with need dispersed in water or an organic solvent. As the conductive material of the conductive coating, silver, nickel, gold, graphite, acetylene black, and Ketjen Black may be mentioned. Preferably, it is graphite or acetylene black. As the binder of the conductive coating, any one illustrated as a binder used for the composite particles of the present invention may be used. Further, water glass, epoxy resin, polyamide imide resin, urethane resin, etc. may also be used. These may be used alone or in combinations of two or more types. The binder of the conductive coating is preferably an acrylate-based polymer, an ammonium salt or alkali metal salt of carboxymethyl cellulose, water glass, or a polyamide imide resin. Further, as the dispersant of the conductive coating, a dispersant which may be used for the composite particles as well or a surfactant may be used.

<Active Material Layers>

The active material layer may be formed by forming the composite particles for an electrochemical device electrode into a sheet, then laminating this on a current collector or by directly forming the composite particles on a current collector to form an active material layer. As the method for forming the active material layer, there are the press forming method or other dry forming method or the coating method or other wet forming method, but the dry forming method which does not require a drying step and keeps down the production costs is preferable. As the dry forming method, there are the press forming method, extrusion method (also called paste extrusion), etc. The press forming method is the method of applying pressure to the electrochemical device electrode material to densify the electrode material by rearrangement and deformation and form the active material layer. The extrusion method is the method of extruding the electrochemical device electrode material by an extrusion machine to form a film, sheet, etc.

Among these, since it is possible to be performed by a simple facility, it is preferable to employ the press forming method. As the press forming method, for example, there is the roll press forming method of supplying an electrode material containing composite particles by a screw feeder or other feeder to a roll press forming apparatus and forming an active material layer, the method of spraying the electrode material on a current collector, spreading the electrode material by a blade etc. to adjust it in thickness, then form it by a press apparatus, the method of filling an electrode material into a mold and pressing the mold to form it, etc.

Among these press forming methods, the roll press forming method is preferable. In this method, the current collector may be fed to the rolls simultaneously with the supply of the electrode material to directly form the active material layer on the current collector. The temperature at the time of forming is usually 0 to 200° C. A temperature higher than the melting point or glass transition temperature of the binder of the composite particles is preferable. A temperature at least 20° C. higher than the melting point or glass transition temperature is preferable. In the roll press forming, the forming speed is usually 0.1 to 20 m/min, preferably 4 to 10 m/min in range. Further, the press line pressure between rolls is usually 0.2 to 30 kN/cm, preferably 1.5 to 15 kN/cm.

To eliminate the variation in thickness of the shaped electrode and raise the density of the active material layer to increase the capacity, it is possible to press it again later in accordance with need. The method of this later pressing is generally pressing by rolls. In the roll press step, two cylindrical rolls are arranged in parallel above and below each other across a narrow distance, are made to rotate in opposite directions, and press the electrode between them. The rolls may be heated, cooled, or otherwise adjusted in temperature.

The above electrode of the present invention is preferably used as an electrode for an electric double layer capacitor. The electric double layer capacitor can be produced using the above electrode, an electrolytic solution, a separator, and other parts by an ordinary method. Specifically, for example, the electrodes are cut to suitable size, next the electrodes are stacked via a separator, and the assembly is wound to a capacitor shape, bent, and inserted into a container which is then filled with an electrolytic solution and sealed.

The electrolytic solution is not particularly limited. A nonaqueous electrolytic solution comprised of an electrolyte dissolved in an organic solvent is preferable. As the electrolyte, any one known in the past can be used. Tetraethyl ammonium tetrafluoroborate, triethyl monomethyl ammonium tetrafluoroborate, tetraethyl ammonium hexafluorophosphate, etc. may be mentioned.

The solvent for dissolving these electrolytes (electrolytic solution solvent) is not particularly limited so long as generally being used as an electrolytic solution solvent. Specifically, propylene carbonate, ethylene carbonate, butylenes carbonate, and other carbonates; γ-butyrolactone or other lactones; sulforanes; or acetonitrile or other nitrites may be mentioned. These may be used alone or as mixed solvents of two or more types. Among these, carbonates are preferable. The concentration of the electrolytic solution is usually 0.5 mol/liter or more, preferably 0.8 mol/liter or more.

As the separator, for example, a polyethylene, polypropylene, or other polyolefin porous film or nonwoven fabric, a porous membrane made mainly of a pulp generally called electrolytic capacitor paper, etc. may be used. Further, instead of the separator, it is possible to use a solid electrolyte.

The composite particles for an electrochemical device electrode of the present invention have primary particles of a volume average particle size of 1 to 500 μm and have $\rho 2/\rho 1$ of 0.03 to 0.60 in range. Due to this, when using roll press forming or other continuous press forming to form the active material layer, the degree of dependence of the amount of supply of the composite particles on the rotary speed of the rolls can be reduced. Even at the time of high speed formation, it is possible to obtain an electrochemical device electrode having an active material layer superior in thickness precision and having a uniform, large thickness.

Further, according to the method of production of the present invention, it is possible to obtain composite particles for an electrochemical device electrode superior in high speed roll press formability. Due to this, when using roll press forming or other continuous press forming to form an active material layer, the degree of dependence of the amount of supply of the composite particles on the roll rotary speed can be made small. Even in high speed forming, it is possible to obtain an electrochemical device electrode superior in thickness precision and having a uniform large thickness.

EXAMPLES

Below, examples and comparative examples will be used to explain the present invention more specifically, but the present invention is not limited to these examples. Note that the parts and % in the examples and comparative examples are based on mass unless particularly indicated otherwise.

<Method of Evaluation>
(Measurement of Volume Average Particle Size of Primary Particles and Measurement of ρ1, ρ2)

The obtained composite particles were measured for particle size distribution by using a laser diffraction type granularity distribution measurement device SALD-3100 made by Shimadzu Seisakusho and a dedicated spray type dry measurement unit DS-21 (primary particle size distribution) and dedicated free fall measurement unit DS-3 (secondary particles size distribution) by compressed air at a pressure of 0.3 MPa and 23° C. Further, a particle size distribution curve was drawn with logarithmic value of the primary particle size or secondary particle size on the abscissa and the frequency on the ordinate, the mode radius R1 was found as the particle size showing the maximum value of the primary particle size distribution curve, ρ1 was found as the relative particle amount of primary particles in the range of particle size of $10^{(logR1)-0.02389}$ to less than $10^{(logR1)+0.02389}$, and ρ2 was found as the relative particle amount of the secondary particles in the particle size range.

(Evaluation of Fluidity of Composite Particles)

The repose angle of the composite particles was measured by a repose angle measurement apparatus (Powder Tester PT-R) and the fluidity was evaluated by the four-stage method based on the following criteria:

planetary mixer to obtain a conductive material dispersion with a solids concentration of 20%. Next, 30 parts of the conductive material dispersion, 8 parts of an aqueous solution containing 5% of carboxymethyl cellulose (Serogen 7A; made by Daiichi Kogyo Seiyaku), 100 parts of an electrode active material comprised of high purity activated carbon powder with a specific surface area of 1,800 m²/g and a volume average particle size of 5 μm "Kurarecoal YP-17D" (made by Kuraray Chemical), 7.5 parts of a thermoplastic binder comprised of a dispersion of a carboxy-modified styrene-butadiene copolymer (average particle size of 0.12 μm, glass transition temperature of −5° C.) dispersed in water (BM400B; made by Nippon Zeon, 40% concentration), and water were mixed by a planetary mixer and diluted by water to a solids concentration of 21% to obtain a slurry. The slurry had pH of 7.7. This slurry was adjusted by 25% ammonia water to pH of 9.5 and spray dried for granulation using a spray dryer (OC-16; made by Ohkawara Kakohki) by a rotary disk type atomizer (diameter 65 mm) of a speed of 20,000 rpm, a hot air temperature of 150° C., and a particle recovery outlet temperature of 90° C. to obtain composite particles. The composite particles were evaluated for properties. The results are shown in Table 1.

TABLE 1

|  |  | Ex. 1 | Ex. 2 | Ex. 3 | Ex. 4 | Ex. 5 | Comp. Ex. 1 | Comp. Ex. 2 | Comp. Ex. 3 | Comp. Ex. 4 |
|---|---|---|---|---|---|---|---|---|---|---|
| Primary average particle size (μm) | | 70 | 56 | 20 | 51 | 51 | 70 | 43 | 56 | 51 |
| Primary particle mode radius R1 (μm) | | 71 | 51 | 24 | 51 | 51 | 71 | 46 | 51 | 51 |
| Relative particle amount ρ1 of primary particles at R1 (%) | | 15.2 | 13.1 | 13.3 | 13.6 | 13.6 | 15.0 | 14.0 | 13.3 | 14.0 |
| Relative particle amount ρ2 of primary particles at R2 (%) | | 4.3 | 3.4 | 0.5 | 1.1 | 0.4 | 10.0 | 10.0 | 0.3 | 0.0 |
| ρ2/ρ1 | | 0.283 | 0.260 | 0.038 | 0.081 | 0.033 | 0.667 | 0.714 | 0.023 | 0.000 |
| Fluidity | | B | B | A | A | A | D | D | A | A |
| Active material layer thickness (μm) | 2 m/min | 873 | 880 | 880 | 908 | 652 | 551 | 589 | 1050 | 780 |
| | 8 m/min | 595 | 646 | 649 | 606 | 591 | Not shapeable | Not shapeable | 871 | Not shapeable |
| Active material layer thickness variation | | 2.9 | 2.5 | 2.9 | 3.7 | 2.3 | — | — | 7.1 | — |

Repose angle of 60° or more: A
Repose angle of 50° to less than 60°: B
Repose angle of 30° to less than 50°: C
Repose angle of less than 30°: D (Thickness and Thickness Precision of Active Material Layer)

The sheet-shaped active material layers obtained at forming speeds of 2 m/min and 8 m/min were randomly punched into 12 mm diameter shapes at 20 locations. The average values of their thicknesses were calculated as the thicknesses of the active material layers. Further, the active material layer formed at 8 m/min was calculated for variation of thickness by the following formula (1):

"Variation"=(Standard Deviation/Average Value)×100    (1)

Example 1

In the above first method of production, 50 parts of a conductive material comprised of acetylene black with an average particle size of 0.7 μm (Denka Black powder; made by Denki Kagaku Kogyo), 200 parts of a dispersant comprised of an aqueous solution containing 5% of carboxymethyl cellulose (Serogen 7A; made by Daiichi Kogyo Seiyaku), and 50 parts of water were mixed and dispersed using a Next, the obtained composite particles were supplied to rolls of a roll press machine (squeezing rough surface hot rolls, made by Hiranogiken) (roll temperature 120° C., press linear pressure 4 kN/cm) using a fixed rate feeder to form a sheet shaped active material layer by roll press forming. The forming process was performed at a roll speed of 2 m/min and 8 m/min. The sheet-shaped active material layers were measured for thickness. The results are shown in Table 1.

Example 2

In the above-mentioned first method of production, 100 parts of an electrode active material comprised of high purity activated carbon powder with a specific surface area of 1,800 m²/g and a volume average particle size of 5 μm "Kurarecoal YP-17D" (made by Kuraray Chemical), 15 parts of a binder comprised of an aqueous dispersion of a core-shell type polymer latex (volume average particle size 0.31 μm, concentration 40%) with monomer units forming the core part comprised of n-butyl acrylate and ethyl methacrylate, the monomer units forming the shell part comprised of n-butyl methacrylate and methacrylic acid, a ratio of composition of the monomer units being n-butyl acrylate: ethyl methacrylate: n-butyl methacrylate: methacrylic acid=40:40:17:3

(mass ratio), a glass transition temperature of the core part of −5° C., and a glass transition temperature of the shell part of 25° C., 5 parts of a conductive material comprised of acetylene black with an average particle size of 0.7 μm (Denka Black powder; made by Denki Kagaku Kogyo), 93.3 parts of a dispersant comprised of a 1.5% aqueous solution of an ammonium salt of carboxymethyl cellulose "DN-800H" (made by Daicel Chemical Industries), and 348.7 parts of ion exchanged water were agitated and mixed by a "TK homomixer" (made by Primix) to obtain a slurry with a solids concentration of 20%. The slurry had pH at 23° C. of 7.6. This slurry was adjusted by 25% ammonia water to pH 8.5 and was spray dried using a spray dryer (OC-16; made by Ohkawara Kakohki) and by a rotary disk type atomizer (diameter 65 mm) of a speed of 25,000 rpm, hot air temperature of 150° C., and a temperature of the particle recovery outlet of 90° C. to obtain composite particles. The composite particles were used in the same way as in Example 1 to form a sheet shaped active material layer. The results of the evaluation are shown in Table 1.

Example 3

Except for not adjusting the pH of the slurry and for using as the spray dryer "OD-22G" (made by Ohkawara Kakohki) and a rotary disk type pin-type atomizer (diameter 125 mm), the same procedure was followed as in Example 2 to obtain composite particles. The composite particles were used in the same way as in Example 1 to form a sheet-shaped active material layer. The results of the evaluation are shown in Table 1.

Example 4

Except for making the amount of binder 30 parts and not adjusting the pH, the same procedure was followed as in Example 2 to obtain composite particles. The slurry used for the spray drying had pH of 7.5. The composite particles were used in the same way as Example 1 to form a sheet-shaped active material layer. The results of the evaluation are shown in Table 1.

Example 5

In the above second method of production, 100 parts of an electrode active material comprised of an alkali activated carbon powder with a specific surface area of 2,200 m²/g and a volume average particle size of 8 μm, 15.6 parts of a binder comprised of an aqueous dispersion of polytetrafluoroethylene (solids concentration 64%), 5 parts of a conductive material comprised of acetylene black with a volume average particle size of 0.7 μm (Denka Black powder; made by Denki Kagaku Kogyo), 93.3 parts of a dispersant comprised of a 1.5% aqueous solution of an ammonium salt of carboxymethyl cellulose "DN-800H" (made by Daicel Chemical Industries), and distilled water were agitated and mixed by a "TK homomixer" (made by Primix) to prepare a slurry with a solids concentration of 20%. This slurry was spray dried for granulation using a spray dryer (OC-16; made by Ohkawara Kakohki) and by a rotary disk type atomizer (diameter 65 mm) with a speed of 25,000 rpm, a hot air temperature 150° C., and a temperature of the particle recovery outlet of 90° C. to obtain granulated particles.

100 parts of the granulated particles and 2 parts of a conductive material comprised of acetylene black with a volume average particle size of 0.7 μm were mixed by a 2 L high speed mixer with a powder contact part made by zirconia (Henschel mixer made by Mitsui Miike Machinery) at 2,000 rpm for 15 minutes to obtain composite particles on the surface of which a conductive material was uniformly deposited. The composite particles were used in the same way as in Example 1 to form a sheet-shaped active material layer. The results of the evaluation are shown in Table 1.

Comparative Example 1

Except for not adjusting the pH of the slurry, the same procedure was followed as in Example 1 to obtain composite particles. The results of the evaluation are shown in Table 1.

Comparative Example 2

Except for not adjusting the pH of the slurry, the same procedure was followed as in Example 2 to obtain composite particles. The results of the evaluation are shown in Table 1.

Comparative Example 3

Except for making the amount of binder 45 parts and not adjusting the pH, the same procedure was followed as in Example 2 to obtain composite particles. The pH of the slurry used for the spray drying was 7.4. The results of the evaluation are shown in Table 1.

Comparative Example 4

The granulated particles obtained by Example 5 were used as they were, without mixing in the conductive material covering at least part of the granulated particles, in the same way as Example 5 to form the active material layer. However, at a roll speed of 8 m/min, a continuous sheet shaped active material layer was not obtained. The obtained composite particles and active material layer were evaluated for properties. The results are shown in Table 1.

Results of Evaluation

The composite particles for an electrochemical device electrode obtained by the first method of production of the present invention (Examples 1 to 4) all have $\rho 2/\rho 1$ in the range of the present invention, that is, 0.03 to 0.60 in range, and gave preferable results in evaluation of the composite particles for fluidity. Further, in formation of the active material layer, it was possible to form an active material layer having a large thickness. Furthermore, even when forming the active material layer at a high speed, it was possible to form an active material layer having a large thickness and having a good thickness precision.

As opposed to this, in Comparative Example 1 and Comparative Example 2, the $\rho 2/\rho 1$ was outside the range of the present invention, the composite particles were high in fluidity, and the fluidity was evaluated poorly. Further, in the formation of the active material layer, an active material layer having a large thickness could not be formed. Furthermore, when forming the active material layer at a high speed, continuous sheet formation was not possible.

Further, in Comparative Example 3, the $\rho 2/\rho 1$ was outside the range of the present invention and the thickness precision was inferior when forming the active material layer at a high speed.

The composite particles for an electrochemical device electrode obtained by the second method of production of the present invention (Example 5), as shown in Table 2, has $\rho 2/\rho 1$ of 0.03 to 0.60 in range. A preferable result could be obtained in evaluation of the fluidity of the composite particles. Further, in formation of the active material layer, an active material layer having a large thickness could be formed. Furthermore, even when forming the active material layer at a high speed, it was possible to form an active material layer having a large thickness and having a good thickness precision.

In Comparative Example 4, the composite particles were not uniformly supplied, so a continuous sheet-shape active material layer could not be obtained in high speed formation.

Above, the present invention was explained with reference to embodiments believed most practical and preferable at the present point of time, but the present invention is not limited to the embodiments disclosed in this Description and can be suitably changed in a range not contravening the gist or idea of the invention which can be read from the Claims and Description as a whole. It must be understood that the composite particles for an electrochemical device electrode, the method of production of the composite particles, and the electrochemical device electrode formed using the composite particles accompanying such changes are included in the technical scope of the present invention.

Note that the present invention relates to the matter contained in Japanese Patent Application No. 2006-95916 filed on Mar. 30, 2006 and Japanese Patent Application No. 2006-322886 filed on Nov. 30, 2006. All of these disclosures are clearly included here as referenced matter.

INDUSTRIAL APPLICABILITY

The composite particles for an electrochemical device electrode of the present invention are useful for producing the electrodes preferably used for lithium ion secondary cells, electric double layer capacitors, and other electrochemical devices, in particular electric double layer capacitors. By using the composite particles for an electrochemical device electrode produced by the method of production of the composite particles for an electrochemical device electrode of the present invention, it is possible to obtain an electrochemical device electrode having an active material layer superior in thickness precision and having a uniform, large thickness.

The invention claimed is:

1. Composite particles for an electrochemical device electrode comprising primary and secondary particles,
   wherein each of the primary and secondary particles contain an electrode active material, a conductive material, and a binder;
   wherein primary particles have a volume average particle size of 1 to 500 μm;
   wherein secondary particles are agglomerates of primary particles;
   wherein $\rho 1$ is defined as the volume percentage of primary particles having a particle size in the range of $10^{(\log R1)-\alpha}$ μm to less than $10^{(\log R1)+\alpha}$ μm relative to the total amount of primary particles at all particles sizes;
   wherein $\rho 2$ is defined as the volume percentage of secondary particles having a particle size in the range of $10^{(\log R1)-\alpha}$ to less than $10^{(\log R1)+\alpha}$ μm relative to the total amount of secondary particles at all particles sizes;
   wherein R1 is defined as the primary particle size corresponding to the largest number of particles in a primary particle size distribution;
   $\alpha$ is 0.05 or less and,
   the ratio of $\rho 2$ to $\rho 1$ is 0.03 to 0.30.

2. The composite particles for an electrochemical device electrode as set forth in claim 1, further containing a dispersant.

3. A method of production of composite particles for an electrochemical device electrode as set forth in claim 1 having
   a step (i) of dispersing or dissolving an electrode active material, a conductive material, and a binder in water to obtain a slurry A,
   a step (ii) of adjusting pH of the slurry A to 8.0 to 10.0, and
   a step (iii) of spray drying the slurry A for granulation (iii).

4. A method of production of composite particles for an electrochemical device electrode as set forth in claim 1 having
   a step (I) of dispersing an electrode active material and a binder in a solvent to obtain a slurry B,
   a step (II) of spray drying the slurry B for granulation to obtain granulated particles, and
   a step (III) of covering at least part of the surface of the granulated particles with a conductive material with a volume average particle size smaller than the granulated particles.

5. The method of production of composite particles for an electrochemical device electrode as set forth in claim 4, wherein the binder is polytetrafluoroethylene.

6. An electrochemical device electrode having a current collector and an active material layer laminated over the current collector, wherein the active material layer is formed by press forming the composite particles for an electrochemical device electrode as set forth in claim 1.

7. The electrochemical device electrode as set forth in claim 6, wherein the press forming is roll press forming.

8. The electrochemical device electrode as set forth in claim 6, which is used for an electric double layer capacitor.

* * * * *